United States Patent [19]

Bantel et al.

[11] Patent Number: 4,634,291

[45] Date of Patent: Jan. 6, 1987

[54] COATING THICKNESS MEASUREMENT

[75] Inventors: Thomas E. Bantel, Cincinnati, Ohio; David F. Lahrman, Champaign, Ill.; John F. Halase, III, Fairfield, Ohio

[73] Assignee: General Electric Company, Cincinnati, Ohio

[21] Appl. No.: 674,998

[22] Filed: Nov. 26, 1984

[51] Int. Cl.$^4$ .................... G01N 25/00; G01N 21/71
[52] U.S. Cl. ........................................ 374/7; 356/381; 374/124
[58] Field of Search ............... 374/4, 5, 7, 15, 124, 374/129; 250/341, 340; 356/381, 382

[56] References Cited

U.S. PATENT DOCUMENTS

| | | | |
|---|---|---|---|
| 2,264,968 | 12/1941 | DeForest | 374/7 |
| 3,016,732 | 1/1962 | Hanysz | 374/7 |
| 3,222,917 | 12/1965 | Roth | 374/5 |
| 3,413,474 | 11/1968 | Freeh | 374/7 |
| 3,448,268 | 6/1969 | Proctor | 374/4 |
| 3,644,667 | 2/1972 | Shimotsuma et al. | 374/124 |
| 3,994,586 | 11/1976 | Sharkins et al. | 250/341 |
| 4,012,691 | 3/1977 | Bartoli et al. | 374/7 |
| 4,129,781 | 12/1978 | Doyle | 250/341 |
| 4,138,878 | 2/1979 | Holmes et al. | 374/7 |

OTHER PUBLICATIONS

*Materials Engineering*, Oct. 1983, p. 24.
*Lasers & Applications*, May 1984, p. 36.

Primary Examiner—Charles Frankfort
Assistant Examiner—Thomas B. Will
Attorney, Agent, or Firm—Gregory A. Welte; Derek P. Lawrence

[57] ABSTRACT

In the present invention, a discrete region of the TBC is heated, as by applying a controlled quantity of laser energy onto the region for a time interval. Then, the radiant thermal energy of a region outside the laser strike region is measured at a predetermined time following the termination of the laser pulse. The intensity of this measured radiant energy is then compared with the radiant intensities which have been experimentally obtained from known thickness specimens and the thickness is inferred therefrom.

2 Claims, 8 Drawing Figures

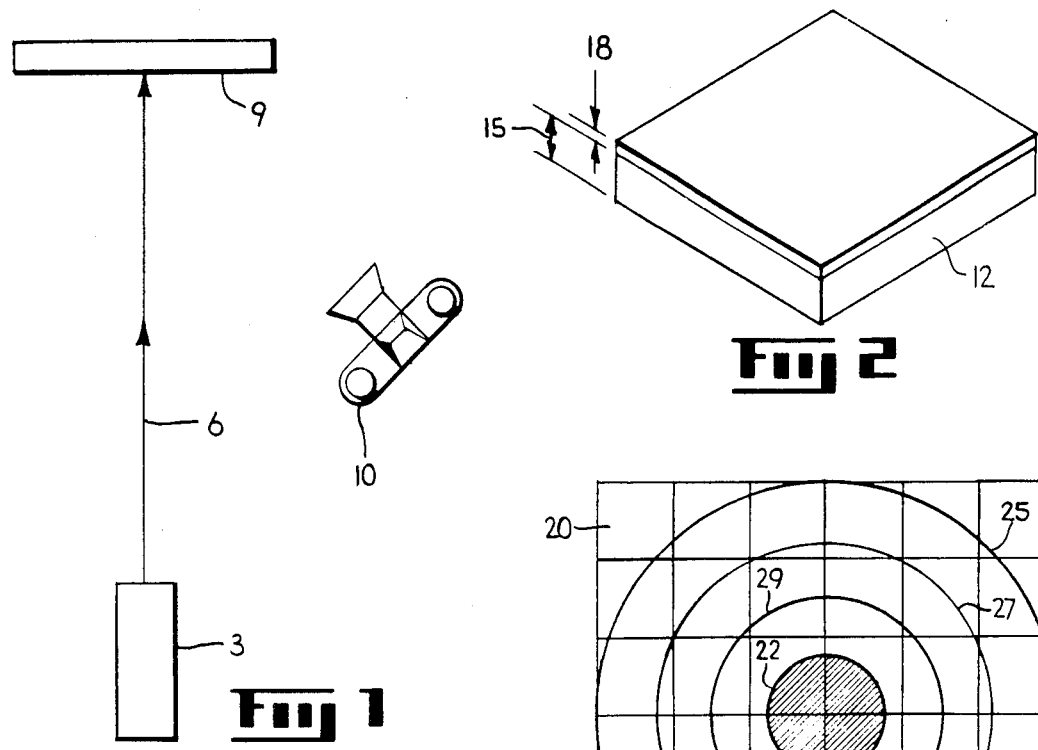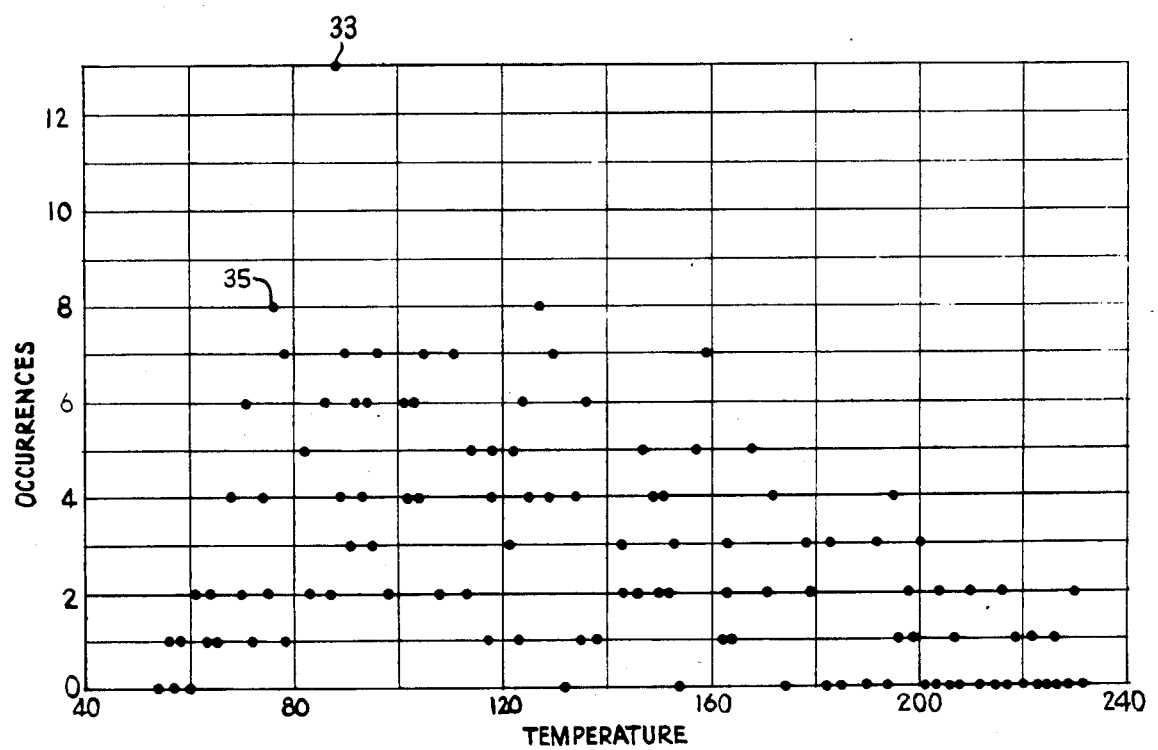

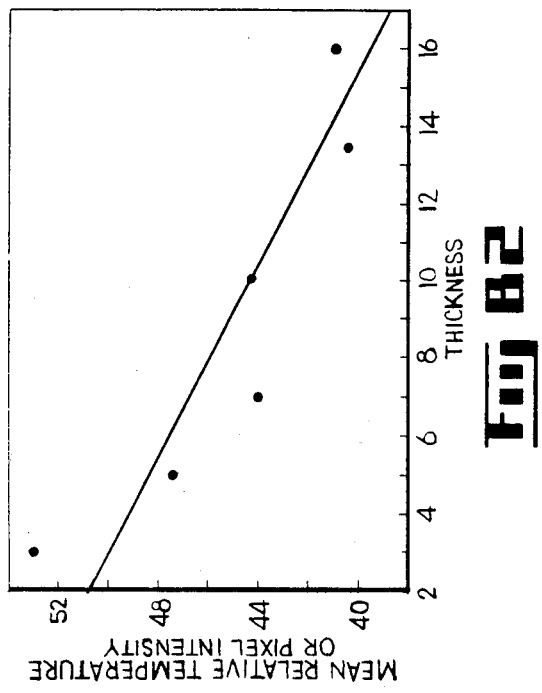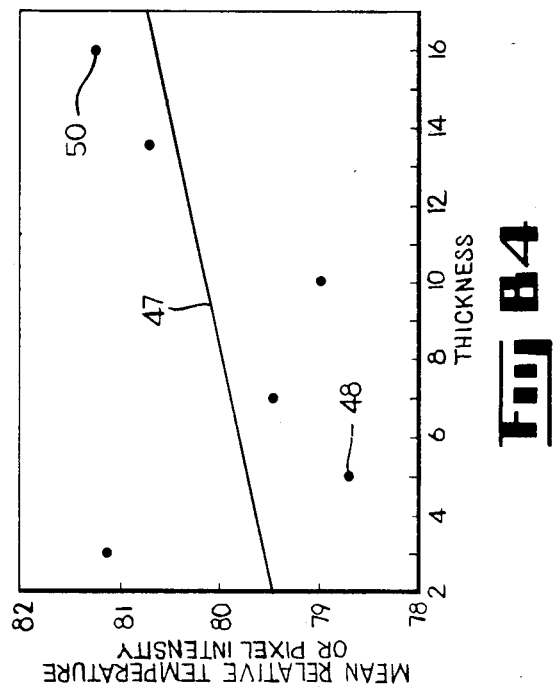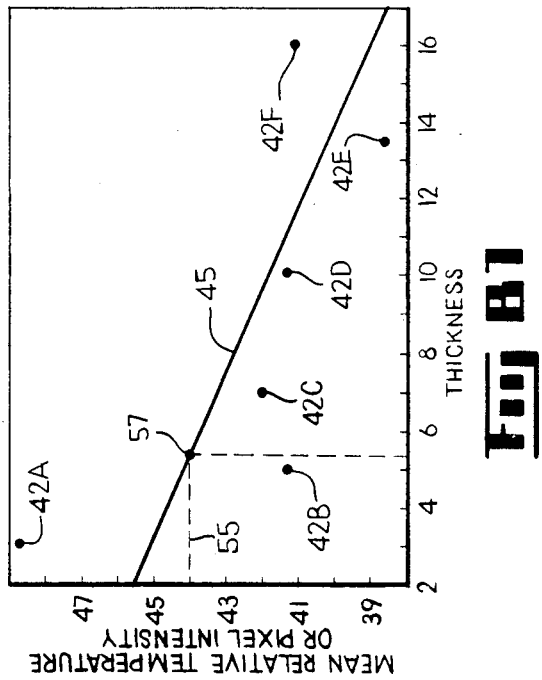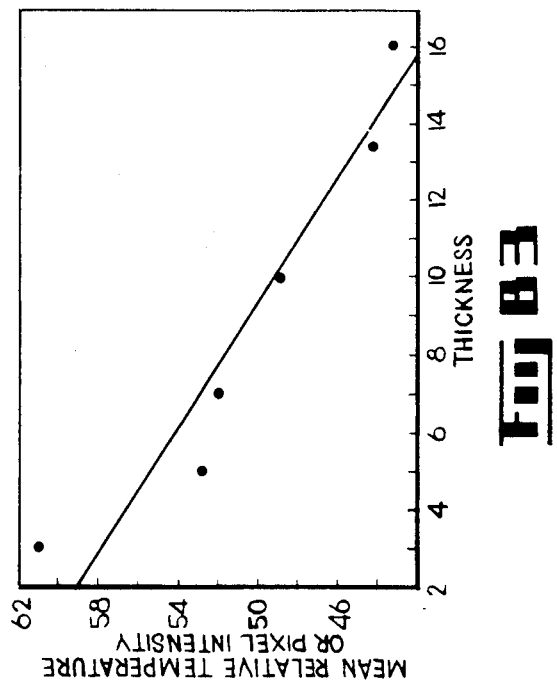

COATING THICKNESS MEASUREMENT

The present invention relates to the measurement of the thickness of a coating and, more specifically, to the measurement of the thickness of a thermal barrier coating on a gas turbine engine blade.

BACKGROUND OF THE INVENTION

Metallic components, such as turbine blades in a gas turbine engine, commonly bear a thermal barrier coating (TBC) which protects the components from hot gases present in the engine. The TBC is thin, of the order of 5 to 15 thousandths of an inch. It is a ceramic-like material having a low heat transfer coefficient and having a high melting point.

The TBC protects the metal of the components from high temperatures by inhibiting heat transfer from the hot gases into the metal. That is, the metal dissipates heat rapidly while the TBC conducts heat into the metal slowly. Thus, the temperature of the metal is kept lower than that of the TBC. Therefore, the gases can be hotter, allowing a more efficient thermodynamic cycle to be used in the engine.

It is desirable to measure the thickness of the TBC during the manufacturing process. However, presently available methods of thickness measurement present difficulties. Four examples of difficulties are the following. One, direct measurement, as by sawing through a component to expose a cross section of the TBC and then measuring the TBC thickness, damages the component. Two, ultrasonic thickness measurement is not feasible because many of the TBCs are porous and disperse the ultrasonic energy. Three, computer aided X-ray tomography does not provide sufficient precision to measure the desired TBC thicknesses. Four, eddy current thickness measurement has proven to be accurate, but technical difficulties are encountered. For example, the eddy current probe typically (a pencil-like apparatus) must be kept at constant pressure and constant, known alignment with the surface of the TBC. Maintaining such alignment on complex contours such as turbine airfoils requires elaborate equipment and a highly trained operator to interpret the data.

OBJECTS OF THE INVENTION

It is an object of the present invention to provide a new and improved TBC thickness measurement.

It is a further object of the present invention to provide improved measurement of the TBC applied to gas turbine engine components.

SUMMARY OF THE INVENTION

In one form of the present invention, a discrete region of the TBC is heated, as by applying a controlled quantity of laser energy onto the region for a time interval. Then, the radiant thermal energy of a region outside the laser strike region is measured at a predetermined time following the termination of the laser pulse. The intensity of this measured radiant energy is then compared with the radiant intensities which have been experimentally obtained from known thickness specimens and the thickness is inferred therefrom.

BRIEF DESCRIPTION OF THE DRAWING

FIG. 1 illustrates one form of the present invention.
FIG. 2 illustrates a coating on a substrate.
FIG. 3 illustrates three regions defined on the pixel matrix generated by the IR camera 10 in FIG. 1.
FIG. 4 illustrates a histogram of data used by the present invention.
FIGS. B-1 to B-4 illustrate least-squares straight lines plotted using data derived from the histogram of FIG. 4.

DETAILED DESCRIPTION OF THE INVENTION

FIG. 1 illustrates one form of the present invention, showing a laser 3 such as a ND:YAG laser of Model No. 512Q, available from Control Laser Corp., located in Orlando, Fla. The laser beam 6 impinges upon a target 9, such as an aircraft engine component bearing a TBC, and heats the target. From the radiant thermal energy distribution of the target at a selected time interval following the laser firing, the thickness of the TBC can be inferred. The radiant intensity distribution can be measured by a scanning infrared radiometer 10 (also called an IR Camera). This will be further illustrated by discussion of an experiment undertaken by Applicants.

Experiment

Applicants obtained six targets which were identical except for the thickness of the TBC coating. Each target was constructed of a Hastelloy substrate 12 as shown in FIG. 2 which was approximately 2×2 inches and 0.060 inches thick (the thickness is dimension 15). Hastelloy is a trademark of the Cabot Corporation, Kokomo, Ind. The TBC thicknesses (dimension 18) for the six targets were 0.003, 0.005, 0.007, 0.010, 0.0135, and 0.016 inches. The TBC was a ceramic coating of zirconium oxide ($ZrO_2$) stabilized with 8% Yttria ($Y_2O_3$). The TBC was applied using vacuum plasma spray deposition as known in the metal coatings art.

Each target was heated by a pulse from the laser 3 in FIG. 1. The laser beam 6 was not focused by lenses, but impinged upon the target with the same diameter as it left the laser cavity (cavity not specifically shown). For each target, three different pulse durations were used, ranging from 5/60ths of a second to 200/60ths of a second. Following termination of the laser pulse, a time delay was interposed before measurement of the radiant intensity distribution of the TBC was taken. The time delays ranged from 20/60ths of a second to 200/60ths of a second.

Measurement of the radiant intensity distribution was accomplished by using the IR camera. The IR camera produces an image containing radiant intensity information. For example, as shown in FIG. 3, a 6×6 matrix of image picture elements (i.e., pixels) is illustrated. Pixel 20 is one such pixel. The laser spot size is shown in the image as circle 22, and it is approximately 0.16 inches in diameter. The IR camera generates an electrical signal for each pixel of an intensity level which is indicative of the temperature of the region of the object viewed by the camera which corresponds to the pixel. In this case, the object viewed is the coated Hastelloy target. Thus, a collection of pixel intensity signals is generated, and for the 6×6 matrix shown in FIG. 3, 36 such signals will be generated.

Applicants have subdivided the matrix shown in FIG. 3 into five regions, as bounded by three concentric circles 25, 27, and 29, of respective diameters of 0.36, 0.24, and 0.18 inches. Region one is the entire area contained within an outermost circle 25. Region two is the annular area contained between circles 25 and 27. Region three is the circular area contained within the middle circle 27. Region four is the annular area contained between circles 27 and 29. Region five is the smallest circular area and is contained within circle 29. Applicants measured the radiant thermal energy distributions of three of these regions, namely, regions two, four, and five. Therefore, given that (1) six targets were used, (2) three laser pulse durations were applied to each target, (3) three different delays were interposed for each firing, and (4) three different areas of the target were measured as to radiant thermal energy, a total of 162 measurements were taken (6×3×3×3).

This total of 162 was doubled by repeating experiment with two changes. The first change was to double the radiometer dynamic range. The dynamic range refers to the range of radiant thermal energy to which the IR camera responds. For example, in the first set of 162 measurements, the range was 10 degrees, centered on a temperature of approximately 70°. Thus, the smallest pixel signal indicated a temperature of 60° and the largest pixel signal indicated a temperature of 80°. In the second set, the range was doubled, to 20°. (Of course, these ranges of 10 and 20 degrees apply only to measurements of a black body. The emissivity of a nonblack body may widen the ranges, as is known in the art. Nevertheless, irrespective of such range changes, the relative pixel intensities still give a good measure of relative temperatures, even if the absolute temperatures are not determinable.)

The second change relates to the delay interposed between pulse termination and radiant thermal energy measurement. In the second set of measurements, the delays were slightly different and within a slightly different range, namely, between 1/60th of a second and 180/60ths of a second. Thus, a total of 324 temperature measurements were taken. Table 1 organizes the procedures just discussed. Each line in the Table represents six measurements, one for each TBC thickness. The columns labeled "Figure" refer to graphical representations of the data which were developed by Applicants. Four such representations are later discussed.

TABLE 1

| | Experiment 1 | | | | Experiment 2 | | |
|---|---|---|---|---|---|---|---|
| FIGURE | LASER PULSE (1/60 sec.) | DATA AREA | DATA DELAY (1/60 sec) | FIGURE | LASER PULSE (1/60 sec.) | DATA AREA | DATA DELAY (1/60 sec) |
| B-1 | 50 | 2 | 20 | B-4 | 50 | 2 | 10 |
| B-2 | 50 | 2 | 50 | B-5 | 50 | 2 | 30 |
| B-3 | 50 | 2 | 100 | B-6 | 50 | 2 | 50 |
| B-7 | 50 | 4 | 20 | B-10 | 50 | 4 | 10 |
| B-8 | 50 | 4 | 50 | B-11 | 50 | 4 | 30 |
| B-9 | 50 | 4 | 100 | B-12 | 50 | 4 | 50 |
| B-13 | 50 | 5 | 20 | B-16 | 50 | 5 | 10 |
| B-14 | 50 | 5 | 50 | B-17 | 50 | 5 | 30 |
| B-15 | 50 | 5 | 100 | B-18 | 50 | 5 | 50 |
| B-19 | 100 | 2 | 20 | B-22 | 100 | 2 | 20 |
| B-20 | 100 | 2 | 50 | B-23 | 100 | 2 | 50 |
| B-21 | 100 | 2 | 100 | B-24 | 100 | 2 | 80 |
| B-25 | 100 | 4 | 20 | B-28 | 100 | 4 | 20 |
| B-26 | 100 | 4 | 50 | B-29 | 100 | 4 | 50 |
| B-27 | 100 | 4 | 100 | B-30 | 100 | 4 | 80 |
| B-31 | 100 | 5 | 20 | B-34 | 100 | 5 | 20 |
| B-32 | 100 | 5 | 50 | B-35 | 100 | 5 | 50 |
| B-33 | 100 | 5 | 100 | B-36 | 100 | 5 | 80 |
| B-37 | 200 | 2 | 30 | B-40 | 200 | 2 | 30 |
| B-38 | 200 | 2 | 80 | B-41 | 200 | 2 | 100 |
| B-39 | 200 | 2 | 200 | B-42 | 200 | 2 | 180 |
| B-43 | 200 | 4 | 30 | B-46 | 200 | 4 | 30 |
| B-44 | 200 | 4 | 80 | B-47 | 200 | 4 | 100 |
| B-45 | 200 | 4 | 200 | B-48 | 200 | 4 | 180 |
| B-49 | 200 | 5 | 30 | B-52 | 200 | 5 | 30 |
| B-50 | 200 | 5 | 80 | B-53 | 200 | 5 | 100 |
| B-51 | 200 | 5 | 200 | B-54 | 200 | 5 | 180 |

As indicated above, each measurement actually contains a collection of pixel intensity values. Applicants processed each collection as follows. First, a histogram was generated. The histogram is a plot of the number of times a given pixel value occurs within a circular region. A sample histogram is shown in FIG. 4. That Figure indicates that 13 pixels (point 33) had an intensity of 84, 8 pixels (point 35) had an intensity of 76, etc. The IR image had a resolution of 128×128, and thus the actual matrix used contained 16,384 pixels, although FIG. 3 illustrates 6×6 matrix for simplicity. However, given that the three regions two, four, and five in FIG. 3 are actually subsets of the entire 128×128 matrix, the total number of occurrences in the histogram of FIG. 4 will be less than the total number of pixels contained in the image. For example, Applicants found that region two contained 490 pixels, region four contained 331 pixels and region five, 103 pixels. Applicants generated a histogram for each of the 324 circular areas.

Since each histogram represents a complex collection of radiant thermal energy data, Applicants chose to simplify the data. Applicants simplified the data by taking the statistical mean (i.e., the average) of the data for each histogram. The mean is computed according to the following equation:

$$\text{mean} = \frac{\Sigma \text{ (no. of occurrences) (intensity value of occurrence)}}{\text{total no. of occurrences}}$$

Thus, 324 statistical means were derived.

For each laser pulse for a given region and a given data delay (i.e., for each line in Table 1), the statistical mean was plotted as a function of the six coating thicknesses of the six Hastelloy targets. This is illustrated in FIGS. B1–B4, which correspond to the lines in Table 1 of the same designation. For each figure, such as FIG. B-1, six statistical means are plotted as shown by points 42A–F in the Figure. A least-squares straight line 45 was fitted to the data points. Similarly, for FIGS. B-2 through B-4 least squares lines were also fitted. Several important aspects of these Figures will now be discussed.

These Figures plot the mean intensity (or relative temperature) data obtained in Area 2 (between circles 25 and 27) in FIG. 3, which is an annular area surrounding the laser impact zone. The reader will note that the mean relative temperature (on the vertical axis) in FIG. B-1 is generally an inverse function of coating thickness. A generally similar inverse relationship is shown in FIGS. B2 and B3. However, for the annular region 2, mean relative temperatures are a generally positive function of the coating thickness. They are considered positive because the least squares line 47 has a positive slope.

Applicants believe that the positive slope in FIG. B4 is due to random effects, because the pixel intensity difference between the lowest value, at point 48, and the highest value, point 50, is less than 4 units. This is in contrast to the difference between point 42A in FIG. B1 and point 42E, which is about 10 units.

In measuring the thickness of a TBC coating, the present invention would be used as follows. Plots such as FIGS. B-1 through B-3 would be generated from reference blades having a known TBC thickness. That is, a laser pulse of known duration and controlled (known) energy level would be fired upon the TBC of known thickness and, following a known time delay, the intensities of the pixels in the annular region 2 in FIG. 3 would be obtained. A number which is representative of a histogram similar to that of FIG. 4 would be derived. Applicants have used the statistical mean as this number. The same laser firing with a same time delay would be repeated for a TBC of a different thickness. Preferably, many different thicknesses would be measured.

Following the generation of a reference plot of data points analogous to FIG. B-1, including a least-squares line 45, a sample blade having a TBC of thickness to be measured is examined using the same laser pulse, the same duration, and the same time delay, and the same annular region 2 is measured to develop a representative number. The representative number (44 in this example) is then inserted as a horizontal line in the Figure as shown by line 55 and the intersection point with the least-square line 45, namely, point 57, indicates the thickness, in this case about 5.5 mils.

Another significant aspect of the present invention lies in the fact that the spot 22 in FIG. 3 of laser impact is not itself measured as to pixel intensity. Instead, the annular region 2 surrounding it is measured.

The derivation of a number considered representative of the data of the histogram of FIG. 4 has been discussed. The actual number derived by the Applicants was the statistical mean. However, the representative number need not be the statistical mean, it could be another representative number such as the statistical median. Further, the representative number was taken as a shortcut. Applicants point out that the goal is to compare the histograms and intensity profiles generated for the reference blades having a known TBC thickness (six targets in the case of Applicants' experiment) with the similar data produced by the sample blade of unknown TBC thickness. That is, a sample collection of pixel intensity data is compared with several collections of reference intensity data in seeking to find which set of reference data the sample set most closely resembles. There are well known statistical and computer techniques for accomplishing this. Therefore, Applicants' invention is not limited to the comparison of the statistical mean of the sample data with the respective statistical means of the reference data.

Applicants' experiment was performed upon what Applicants believe to be very pure and homogenous TBC coatings upon the six targets Applicants used. However, since Applicants believe that the inverse correlation shown in FIGS. B-1 through B-3 is a result of the heat transfer phenomenon occurring in the TBC-Hastelloy system, then the thickness measured in the sample blade by deriving point 57 in FIG. B1 as described above relates to the dimensional TBC thickness of the sample blade, but, more specifically, is a direct measure of the effective or equivalent thermal barrier thickness.

For example, the TBC of the sample blade may have been contaminated by metal particles, which would reduce the insulating properties of the TBC. However, the contaminated coating may be applied thickly. Thus, the thicker coating would compensate for a reduction in insulation. The use of Applicants' measurement technique would not result in showing the actual TBC thickness, but would indicate the equivalent thickness of the TBC if it were applied with the same purity as the purities of the reference blades. (It is assumed that all of the reference blades have a TBC of the same composition and purity.)

Numerous substitutions and modifications can be undertaken without departing from the true spirit and scope of the present invention.

What is desired to be secured by Letters Patent of the United States is the invention as defined in the following claims.

We claim:

1. A method of ascertaining the equivalent thermal barrier thickness of a coating comprising the following steps:
   (a) transferring heat to a part of the coating from an external source;
   (b) measuring the relative temperature intensity distribution of a part of the coating other than the part of (a); and
   (c) comparing the relative temperature intensity distribution measured in (b) with a preestablished collection of reference intensities relating to actual coating specimens having known thermal barrier equivalent values and selecting from the reference collection a second distribution having a predetermined relationship to the relative temperature intensity distribution.

2. A method of measuring the thickness of a coating comprising the following steps:
   (a) firing a laser onto a strike region for a predetermined duration;
   (b) following a predetermined time interval after the laser firing, measuring the intensities of a plurality of regions of the coating contained within an annular region surrounding the laser strike region;
   (c) developing a first number which is representative of the plurality of measured intensities; and
   (d) comparing the representative first number with a preestablished collection of representative numbers relating to actual coating specimens having known thermal barrier equivalent values and selecting a second number from the collection having a predetermined relationship to the representative first number.

* * * * *